(12) United States Patent
Doi et al.

(10) Patent No.: US 7,239,764 B2
(45) Date of Patent: Jul. 3, 2007

(54) OPTICAL WAVEGUIDE DEVICE WITH REDUCED DRIVING VOLTAGE

(75) Inventors: Masaharu Doi, Kawasaki (JP); Tadao Nakazawa, Kawasaki (JP); Masaki Sugiyama, Kawasaki (JP); Masaaki Ohyama, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 92 days.

(21) Appl. No.: 10/298,560

(22) Filed: Nov. 19, 2002

(65) Prior Publication Data

US 2003/0147576 A1 Aug. 7, 2003

(30) Foreign Application Priority Data

Feb. 7, 2002 (JP) .............................. 2002-031483

(51) Int. Cl.
*G02F 1/35* (2006.01)
*G02B 6/26* (2006.01)

(52) U.S. Cl. ................................. 385/3; 385/2; 385/40

(58) Field of Classification Search .................... 385/2, 385/3, 8, 9, 40, 41, 50, 129
See application file for complete search history.

(56) References Cited

U.S. PATENT DOCUMENTS

| 4,273,411 | A | * | 6/1981 | Alferness | 385/40 |
| 5,015,053 | A | * | 5/1991 | Johnson | 385/2 |
| 5,032,805 | A | * | 7/1991 | Elmer et al. | 333/156 |
| 5,210,407 | A | * | 5/1993 | Ito et al. | 250/227.11 |
| 5,278,923 | A | | 1/1994 | Nazarathy et al. | 385/3 |
| 5,359,449 | A | * | 10/1994 | Nishimoto et al. | 385/2 |
| 5,434,700 | A | * | 7/1995 | Yoo | 385/122 |
| 6,222,965 | B1 | | 4/2001 | Smith | 385/40 |
| 2001/0046341 | A1 | | 11/2001 | Nakabayashi | 385/14 |

FOREIGN PATENT DOCUMENTS

GB     2 344 658     6/2000

(Continued)

OTHER PUBLICATIONS

Copy of European Search Report dated Feb. 15, 2005 (3 pages).
Japanese Patent Office "Notice of Reasons for Rejection", dated Feb. 15, 2005.

(Continued)

*Primary Examiner*—Rodney Bovernick
*Assistant Examiner*—Omar Rojas
(74) *Attorney, Agent, or Firm*—Staas & Halsey LLP

(57) ABSTRACT

The present invention provides an optical waveguide device wherein a driving voltage to be applied is reduced. The optical waveguide device comprises a substrate cut in a Z-axis direction and having an electro-optical effect, an interference type optical waveguide formed on the substrate for causing lights which propagate along a plurality of parallel optical waveguides to interfere with each other, and a lumped-constant type electrode for applying a voltage for the electro-optical effect to the light propagating along the optical waveguides which form the interference type optical waveguide. The lumped-constant type electrode complements potentials to be supplied to adjacent ones of the plurality of parallel optical waveguides to each other such that voltages having an equal absolute value but having the opposite signs are applied to the adjacent optical waveguides. The apparatus of the present invention is applied to, for example, an optical communication system.

16 Claims, 5 Drawing Sheets

FOREIGN PATENT DOCUMENTS

| | | |
|---|---|---|
| JP | 62-14627 | 1/1987 |
| JP | 4-332878 | 11/1992 |
| JP | 11-231358 | 8/1999 |
| JP | 2000-275590 | 10/2000 |

OTHER PUBLICATIONS

Japanese Patent Office Action (Notification of Reason(s) for Refusal) dated Jan. 31, 2006, in corresponding Japanese Application No. 2002-031483.

* cited by examiner

OPTICAL WAVEGUIDE DEVICE WITH REDUCED DRIVING VOLTAGE

BACKGROUND OF THE INVENTION

1) Field of the Invention

This invention relates to an optical waveguide device suitable for use with an optical communication system.

2) Description of the Related Art

With the increase of the data transfer rate in recent years, in the field of optical communication systems, development of an optical waveguide device for modulating a data signal from an electric signal into an optical signal is proceeding energetically.

FIG. 3 is schematic view showing an optical modulator 110 to which a conventional optical waveguide device 100 for performing such optical modulation as just described is applied. The optical modulator 110 shown in FIG. 3 is formed by connecting RF signal generators 106a and 106b and biasing power supplies 107a and 107b, which are hereinafter described, to the optical waveguide device 100.

In the optical waveguide device 100 shown in FIG. 3, a Mach-Zehnder type optical waveguide 102 including a light incoming side Y-branch waveguide 102a, linear waveguides 102b and 102c and a light outgoing side Y-branch waveguide 102d is formed on a substrate 101Z wherein $LiNbO_3$ (lithium niobate) is cut in vertical to the Z-axis of crystal orientation or a Z-cut direction.

Further, reference characters 103a and 103b denote signal electrodes mounted on the linear waveguides 102b and 102c, respectively. The signal electrodes 103a and 103b are connected to separate RF (Radio Frequency) signal generators 106a and 106b and apply RF signals, whose phases are opposite each other, from the RF signal generators 106a and 106b as modulation signals, respectively.

Further, reference characters 104a and 104b denote bias electrodes provided separately from the signal electrodes 103a and 103b, respectively. The bias electrode 104a is connected to the power supply 107a which produces a DC voltage ($+V_0$), and provides a voltage as a DC (Direct Current) bias component to a microwave applied to the signal electrode 103a. The bias electrode 104b is connected to the power supply 107b which produces another DC voltage ($-V_0$) and provides a voltage as a DC bias component to a microwave applied to the signal electrode 103b.

Further, reference numeral 105 denotes a ground electrode. The ground electrode 105 provides a ground potential as a reference for the voltages to be supplied from the signal electrodes 103a and 103b and bias electrodes 104a and 104b and is formed in a predetermined spaced relationship from the formation areas of the electrodes 103a, 103b, 104a and 104b.

Consequently, the voltages ($-V_0$ and $+V_0$) whose absolute values are equal to each other but whose signs are opposite to each other with reference to the potential of the ground electrode 105 are applied to the bias electrodes 104a and 104b to control a drive point corresponding to the signal electrodes 103a and 103b, respectively.

In the case of such a dual electrode structure as shown in FIG. 3 wherein the signal electrodes 103a and 103b are formed on the linear waveguides 102b and 102c, respectively, since wavelength chirp in the linear waveguides 102b and 102c can cancel each other in the outgoing side Y-branch waveguide 102d, the dual electrode structure of FIG. 3 is useful to an optical modulator for long distance transmission in that distortion of a pulse waveform as modulation data can be suppressed.

FIG. 4 is a schematic view showing a second optical modulator 210 to which another conventional optical waveguide device 200 for performing light modulation is applied. In the optical waveguide device 200 shown in FIG. 4, a Mach-Zehnder type optical waveguide 202 having a branch width smaller than that in the optical waveguide device 100 described hereinabove with reference to FIG. 3 is formed on a substrate 101X wherein $LiNbO_3$ (lithium niobate) is cut in vertical to the X-axis of crystal orientation or a X-cut direction. It is to be noted that the optical waveguide 202 includes a light incoming side Y-branch waveguide 202a, linear waveguides 202b and 202c, and a light outgoing side Y-branch waveguide 202d.

In the optical waveguide device 200 shown in FIG. 4, since the electric field direction when a voltage is applied is different from that in the optical waveguide device 100 shown in FIG. 3, a single signal electrode 203 and a single bias electrode 204 are formed on a formation face for the linear waveguides 202b and 202c in parallel along and between the linear waveguides 202b and 202c. Consequently, similarly as in the case of FIG. 3, the signal electrode 203 can cancel wavelength chirp in the linear waveguides 202b and 202c.

It is to be noted that reference numeral 205 denotes a ground electrode, 206 an RF signal generator connected to the signal electrode 203, and 207 a power supply connected to the bias electrode 204.

It is to be noted that, where such a substrate 101X which extends in parallel to the X-axis of crystal orientation as shown in FIG. 4 is used, it is difficult to establish velocity matching between the microwave and the light. Therefore, it is usually the case that, when high-rate data is to be modulated, an optical waveguide device having the configuration shown in FIG. 3 is utilized to form an optical modulator.

However, where an optical waveguide device having such a configuration as described hereinabove with reference to FIG. 3 is utilized to form an optical modulator, since it is obliged to secure some lengths for the signal electrodes 103a and 103b on the linear waveguide 102b and 102c, it cannot be avoided to form the bias electrodes 104a and 104b comparatively short.

Since the product of the operating point voltage and the length of the electrode is specified to a fixed value from the characteristic of the device, it cannot be avoided to set the driving voltage for each of the bias electrodes 104a and 104b having a small length, that is, the driving voltages of the power supplies 107a and 107b, to a comparatively high voltage. Further, where the dual electrode structure is used, there is a subject that it cannot be avoided to prepare a plurality of power supplies for supplying such comparatively high driving voltages as described above.

SUMMARY OF THE INVENTION

It is an object of the present invention to provide an optical waveguide device wherein a driving voltage to be applied is reduced.

In order to attain the object described above, according to an aspect of the present invention, there is provided an optical waveguide device, comprising a substrate cut in a Z-axis direction and having an electro-optical effect, an interference type optical waveguide formed on the substrate for causing lights which propagate along a plurality of parallel optical waveguides to interfere with each other, and a lumped-constant type electrode for applying voltages for the electro-optical effect to the respective lights propagating along the optical waveguides which form the interference type optical waveguide, the lumped-constant type electrode complementing potentials to be supplied to adjacent ones of the plurality of parallel optical waveguides each other such that voltages having an equal absolute value but having the opposite signs are applied to the adjacent optical waveguides.

According to another aspect of the present invention, there is provided an optical waveguide device, comprising a substrate cut in a Z-axis direction and having an electro-optical effect, an interference type optical waveguide formed on the substrate for causing lights which propagate along a plurality of parallel optical waveguides to interfere with each other, a plurality of signal electrodes formed respectively on the optical waveguides which form the interference type optical waveguide, and a bias electrode for biasing signal components to be applied to the respective signal electrodes, the bias electrode complementing potentials to be supplied to adjacent ones of the plurality of parallel optical waveguides each other such that voltages having an equal absolute value but having the opposite signs are applied to the adjacent optical waveguides.

Preferably, the bias electrode includes a first potential supplying electrode section to which a first potential is applied, a second potential supplying electrode section to which a second potential different from the first potential is applied, a plurality of waveguide electrode sections formed respectively on the optical waveguides at a next stage to the signal electrodes for receiving the potentials alternately from the first and second potential supplying electrode sections in order of the parallel arrangement of the plurality of optical waveguides, and at least one potential difference producing electrode section disposed in the proximity of that one of the waveguide electrode sections, which supplies the potential from one of the first and second potential supplying electrode sections, for supplying the potential supplied from the other of the first and second potential supplying electrode sections.

In this instance, one of the first and second potentials supplied from the first and second potential supplying electrode sections may be the ground potential, or the first and second potentials supplied from the first and second potential supplying electrode sections may be potentials having an equal absolute value but having the opposite signs.

According to a further aspect of the present invention, there is provided an optical waveguide device, comprising a substrate cut in a Z-axis direction and having an electro-optical effect, an interference type optical waveguide formed on the substrate for causing lights which propagate along two parallel optical waveguides to interfere with each other, a first signal electrode formed on one of the two parallel optical waveguides which form the interference type optical waveguide, a second signal electrode formed on the other of the two parallel optical waveguides which form the interference type optical waveguide, a first bias electrode for biasing a signal component to be applied to the first signal electrode, and a second bias electrode for biasing a signal component to be applied to the second signal electrode, the first and second bias electrodes complementing the potentials thereof each other such that voltages having an equal absolute value but having the opposite signs are applied to the two parallel optical waveguides.

Preferably, the bias electrode includes a first potential supplying electrode section to which a first potential is applied, a second potential supplying electrode section to which a second potential different from the first potential is applied, a first waveguide electrode section formed on the one optical waveguide at a next stage to the first signal electrode for receiving the potential supplied from the first potential supplying electrode section, a second waveguide electrode section formed on the other optical waveguide at a next stage to the second signal electrode for receiving the potential supplied from the second potential supplying electrode section, a first potential difference producing electrode section formed in such a manner as to sandwich the first waveguide electrode section therebetween for supplying the potential from the second potential supplying electrode section, and a second potential difference producing electrode section formed in such a manner as to sandwich the second waveguide electrode section therebetween for supplying the potential from the first potential supplying electrode section.

In the optical waveguide devices of the present invention, preferably the interference type optical waveguide is a Mach-Zehnder type optical waveguide.

With the optical waveguide devices of the present invention, a lumped-constant type electrode or a bias electrode complements potentials to be supplied to adjacent ones of a plurality of parallel optical waveguides to each other to apply voltages having an equal absolute value but having the opposite signs to the adjacent optical waveguides. Therefore, the following effects or advantages are attained.

1. While only a single power supply is utilized, the voltages having an equal absolute value but having the opposite signs can be applied. Consequently, there are advantages that the number of power supplies to be prepared can be decreased, and that the present invention can contribute to reduction of the operation cost of an optical communication system.

2. Also where an optical modulator is formed otherwise without reducing the number of power supplies, while the voltage values to be generated are reduced to one half when compared with those of the conventional power supply, voltages similar to those of the conventional optical waveguide device can be applied as the voltage values. Consequently, there is an advantage that the present invention can contribute to reduction of the operation cost of an optical communication system.

The above and other objects, features and advantages of the present invention will become apparent from the following description and the appended claims, taken in conjunction with the accompanying drawings in which like parts or elements are denoted by like reference characters.

DESCRIPTION OF THE PREFERRED EMBODIMENTS

In the following, embodiments of the present invention are described with reference to the drawings.

[a] Description of the First Embodiment

Figure 1:
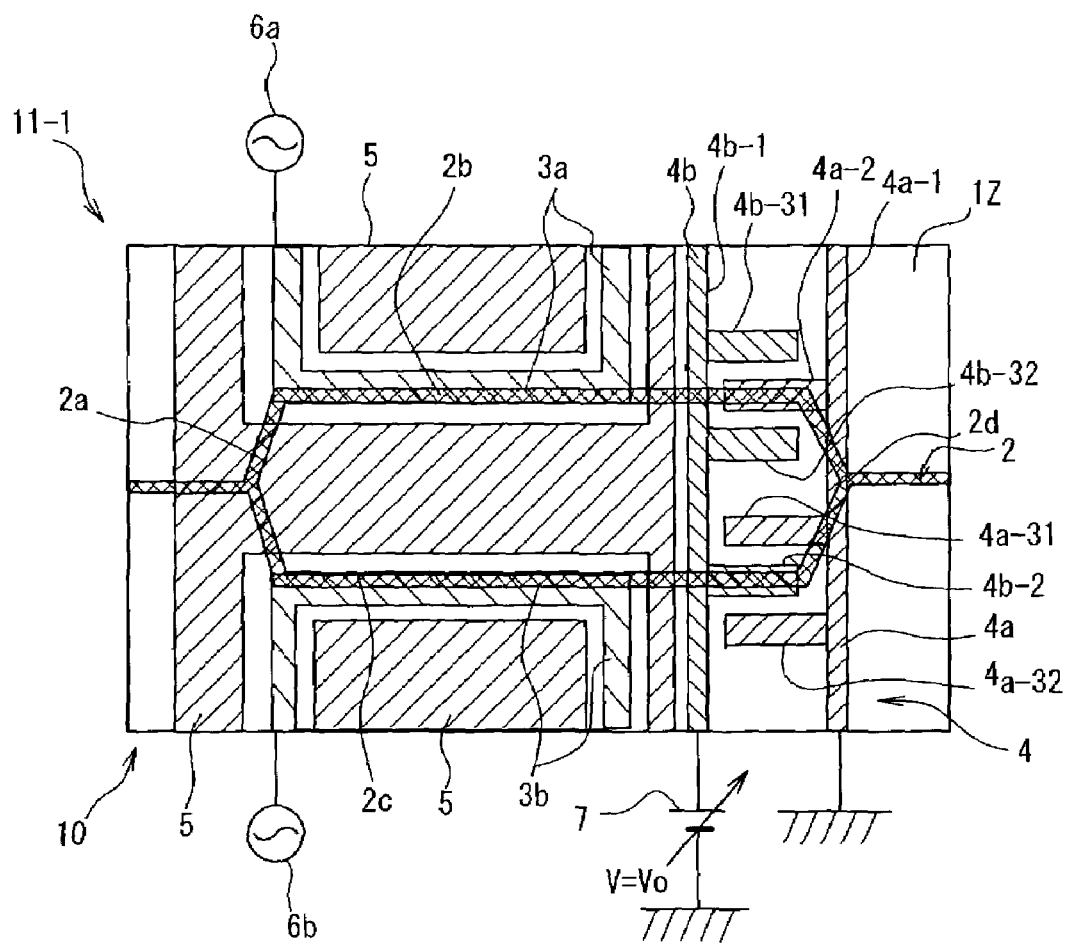
FIG. 1 is a schematic view showing an optical waveguide device according to a first embodiment of the present invention.

FIG. 1 is a schematic view showing an optical modulator 11-1 to which an optical waveguide device 10 according to a first embodiment of the present invention is applied. The optical modulator 11-1 shown in FIG. 1 is formed by connecting RF signal generators 6a and 6b and a biasing power supply 7, which are hereinafter described, to the optical waveguide device 10 having a characteristic configuration according to the present invention.

Here, the optical waveguide device 10 shown in FIG. 1 includes a substrate 1Z, and further includes an optical waveguide 2, signal electrodes 3a and 3b, a bias electrode 4 and a ground electrode 5 formed on the substrate 1Z.

Figure 3:
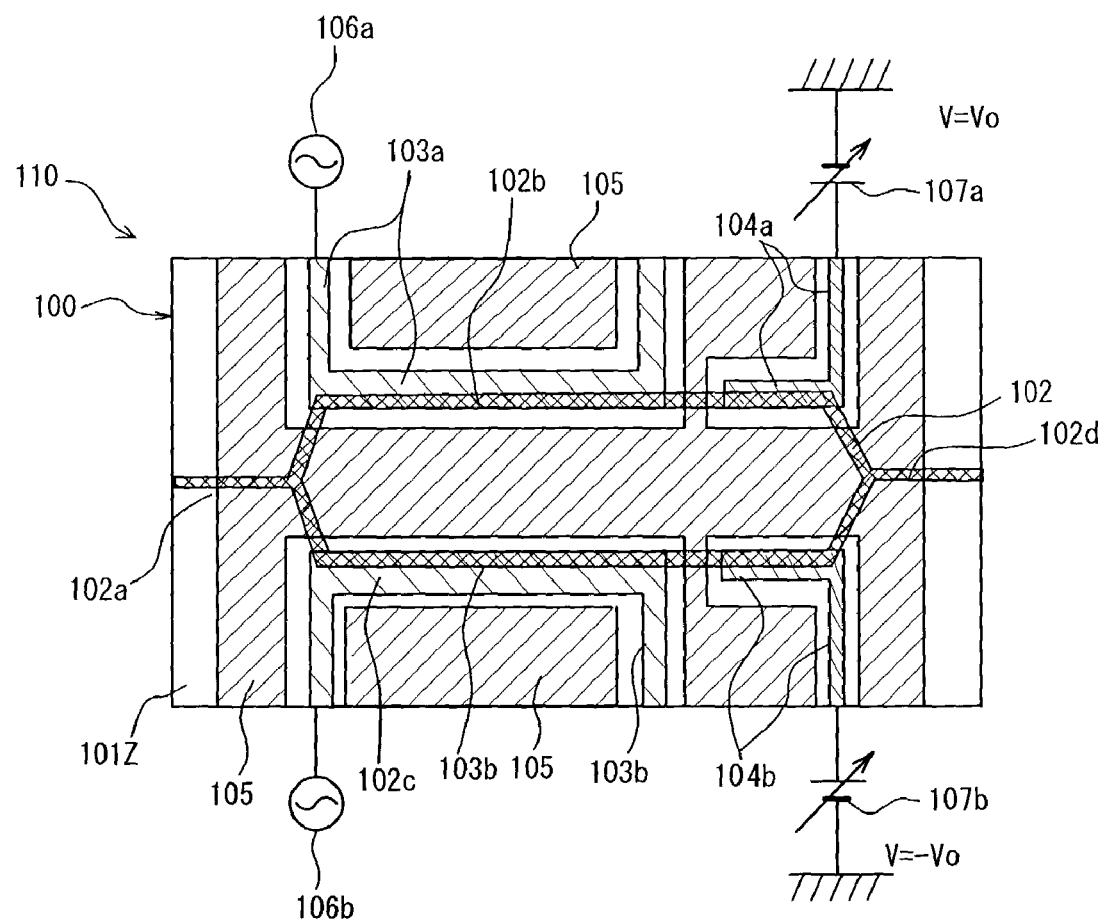
FIG. 3 is a schematic view showing a conventional optical waveguide device.
Figure 4:
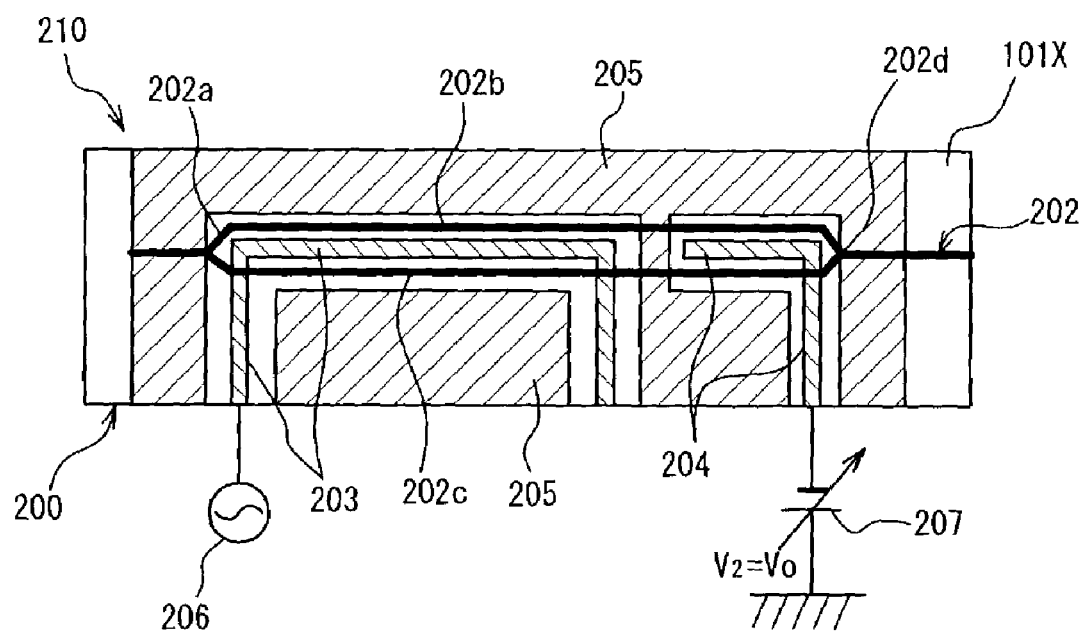
FIG. 4 is a schematic view showing another conventional optical waveguide device.

Similarly to the substrate 101Z shown in FIG. 3, the substrate 1Z has a configuration wherein LiNbO$_3$ (lithium niobate) which is a material having an electro-optical effect is cut in vertical to the Z-axis of crystal orientation or a Z-cut direction. A Mach-Zehnder type waveguide 2 including a light incoming side Y-branch waveguide 2a, linear waveguides 2b and 2c and a light outgoing side Y-branch waveguide 2d is formed on the substrate 1Z.

In other words, the optical waveguide 2 described above is formed on the substrate 1Z and functions as an interference type optical waveguide wherein the lights propagating along the plurality of optical waveguides (that is, two linear waveguides 2b and 2c) extending in parallel to each other interfere with each other at the Y-branch waveguide 2d.

Further, the signal electrodes 3a and 3b are formed on the linear waveguides 2b and 2c, respectively. The signal electrode 3a functions as a first signal electrode formed on the linear waveguide 2b as one of the two optical waveguides which extend in parallel to each other and form the interference type optical waveguide 2, and the signal electrode 3b functions as a second signal electrode formed on the linear waveguide 2c as the other optical waveguide. Consequently, also in the optical waveguide device 10 shown in FIG. 1, similarly as in the optical waveguide device 100 shown in FIG. 3, a dual electrode structure wherein the signal electrodes 3a and 3b are formed on the linear waveguides 2b and 2c is formed.

Further, the signal electrodes 3a and 3b are connected to RF (Radio Frequency) signal generators 6a and 6b which generate RF signals having phases opposite to each other and apply the RF signals from the RF signal generators 6a and 6b as signals for optical modulation, respectively.

Furthermore, the bias electrode 4 is provided to bias signal components to be applied to the signal electrodes 3a and 3b, and includes a first bias electrode 4a and a second bias electrode 4b.

The first and second bias electrodes 4a and 4b have a comb-like electrode structure so that bias voltages applied to the linear waveguides 2b and 2c which form the Mach-Zehnder type optical waveguide 2 are different from each other.

In particular, the first bias electrode section 4a includes a first potential supplying electrode section 4a-1 to which a first potential (V=0, the ground potential) is applied, a first waveguide electrode section 4a-2 formed so as to supply the potential from the first potential supplying electrode section 4a-1 to the linear waveguide 2b at the next stage to the first signal electrode 3a, and at least two second potential difference producing electrodes 4a-31 and 4a-32 formed in such a manner as to sandwich a second waveguide electrode section 4b-2 hereinafter described therebetween for supplying the potential from the first potential supplying electrode section 4a-1.

The second bias electrode section 4b includes a second potential supplying electrode section 4b-1 to which a second potential (V=V$_0$) different from the first potential described above is supplied, a second waveguide electrode section 4b-2 formed so as to supply the potential from the second potential supplying electrode section 4b-1 to the linear waveguide 2c at the next stage to the second signal electrode 3b, and at least two first potential difference producing electrode sections 4b-31 and 4b-32 formed in such a manner as to sandwich the first waveguide electrode section 4a-2 therebetween for supplying the potential from the second potential supplying electrode section 4b-1.

In particular, the first potential supplying electrode section 4a-1 of the bias electrode section 4a is configured as a trunk of the comb-like formation described above, and the first waveguide electrode section 4a-2 and two second potential difference producing electrode sections 4a-31 and 4a-32 are configured as branches of the comb-like formation described above. The second potential supplying electrode section 4b-1 of the bias electrode section 4b is configured as a trunk of the comb-like formation described above, and the second waveguide electrode section 4b-2 and two first potential difference producing electrode sections 4b-31 and 4b-32 are configured as branches of the comb-like formation described above.

The ground potential (V=0) as the first potential is supplied to the first potential supplying electrode section 4a-1. Consequently, the potentials of the first waveguide electrode section 4a-2 and the second potential difference producing electrode sections 4a-31 and 4a-32 which form the first bias electrode 4a can be set to the ground potential.

Meanwhile, the power supply 7 for supplying the potential V=V$_0$ is connected to the second potential supplying electrode section 4b-1, and the potential V=V$_0$ as the second potential is applied to the second potential supplying electrode section 4b-1. Consequently, also the potentials of the second waveguide electrode section 4b-2 and the first potential difference producing electrodes 4b-31 and 4b-32 can be set to the potential V=V$_0$.

Consequently, while the potential of the first waveguide electrode section 4a-2 is the ground potential, the potential of the two second potential difference producing electrode sections 4b-31 and 4b-32 formed in such a manner as to sandwich the first waveguide electrode section 4a-2 therebetween is the potential V=V$_0$. Therefore, a bias voltage to be applied to the linear waveguide 2b is a potential V=−V$_0$ which is a potential difference between the first waveguide electrode section 4a-2 and the second potential difference producing electrode sections 4b-31 and 4b-32.

Further, while the potential of the second waveguide electrode section 4b-2 is the potential V=V$_0$, the potential of the first potential difference producing electrode sections 4a-31 and 4a-32 formed in such a manner as to sandwich the second waveguide electrode potential 4b-2 therebetween is the ground potential. Therefore, a bias voltage to be applied to the linear waveguide 2c is a potential V=V$_0$ which is a potential difference between the second waveguide electrode section 4b-2 and the first potential difference producing electrode sections 4a-31 and 4a-32.

In other words, since the first and second bias electrodes 4a and 4b complement the potentials thereof each other, the voltages having an equal absolute value but having the opposite signs to each other are applied to the linear waveguides 2b and 2c.

It is to be noted that the ground electrode 5 is formed only within a range within which an electric field originating from the voltages applied to the signal electrodes 3a and 3b mainly has an influence, but is not formed within another range within which an electric field originating from the voltage applied to the bias electrode 4 described above has an influence.

Due to the configuration described above, in the optical modulator 11-1 to which the optical waveguide device 10 according to the first embodiment of the present invention is applied, the first bias electrode 4a is grounded and the voltage $V=V_0$ from the power supply 7 is applied to the second bias electrode 4b. However, since the potentials of the first and second bias electrodes 4a and 4b complement each other, the potential difference $V=-V_0$ can be obtained as the bias voltage for the linear waveguide 2b, and the potential difference $V=V_0$ can be obtained as the bias voltage for the linear waveguide 2c.

As described above, with the optical waveguide device according to the first embodiment of the present invention, also where the dual electrode structure wherein the signal electrodes 3a and 3b are formed on the linear waveguides 2b and 2c is used, voltages having an equal absolute value but having the opposite signs to each other can be applied from the bias electrode 4 while only the single biasing power supply 7 is utilized. Therefore, the optical waveguide device is advantageous in that the number of power supplies to be prepared can be decreased, and that it can contribute to reduction of the operation cost of an optical communication system.

It is to be noted that, in the first embodiment described above, the first potential to be supplied to the first potential supplying electrode section 4a-1 is the ground potential and the second potential to be supplied to the second potential supplying electrode section 4b-1 is the potential $V=V_0$. However, according to the present invention, it is otherwise possible to use the potential $V=V_0$ as the first potential to be supplied to the first potential supplying electrode section 4a-1 and use the ground potential as the second potential to be supplied to the second potential supplying electrode section 4b-1.

[b] Description of the Second Embodiment

Figure 2:
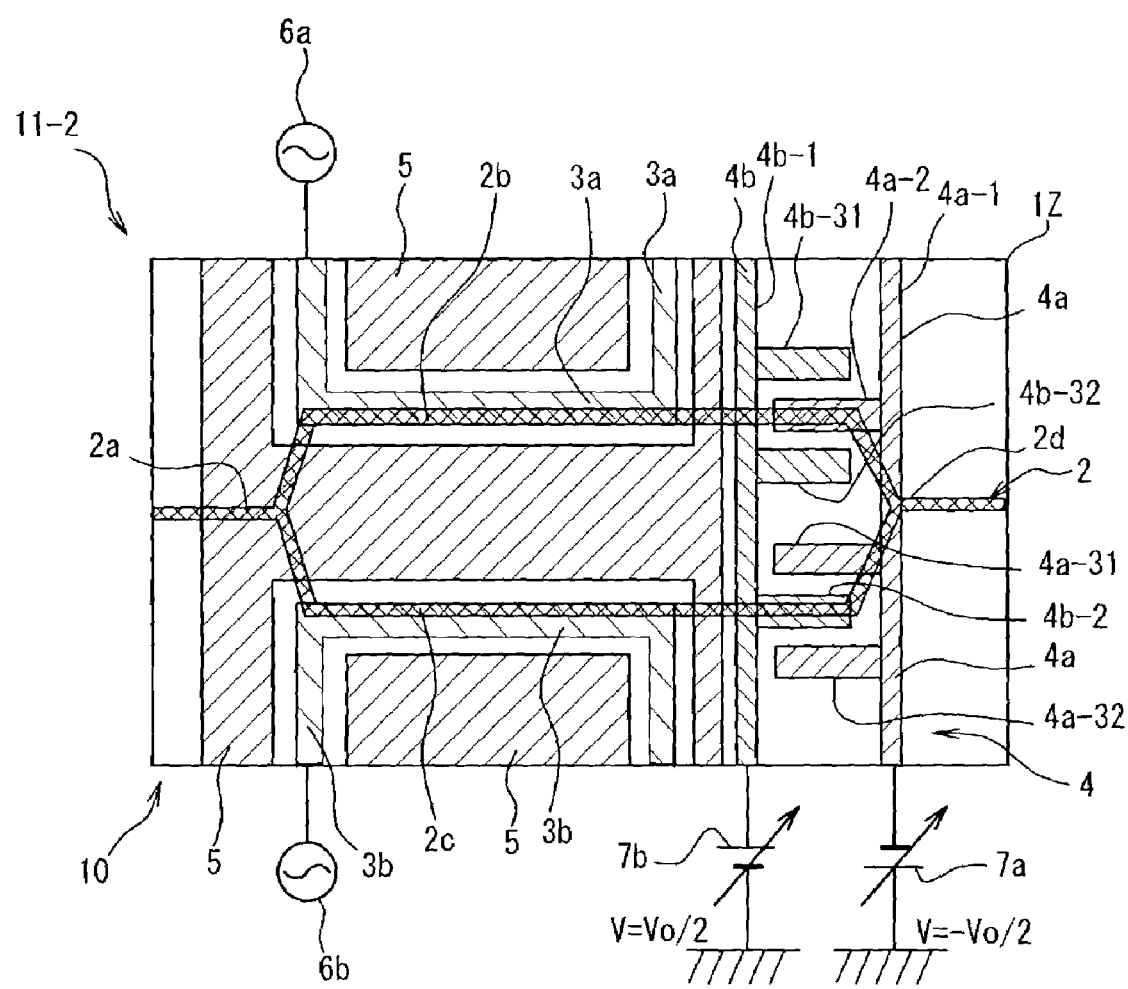
FIG. 2 is a schematic view showing an optical waveguide device according to a second embodiment of the present invention.

FIG. 2 is a schematic view showing an optical modulator 11-2 to which an optical waveguide device according to a second embodiment of the present invention is applied. The optical modulator 11-2 shown in FIG. 2 is different, when compared with that in the first embodiment described hereinabove, in that separate power supplies 7a and 7b are connected to the first and second potential supplying electrode sections 4a-1 and 4b-1, respectively, such that the first and second potentials to be applied to the first and second potential supplying electrode sections 4a-1 and 4b-1 are potentials having an equal absolute value but having the opposite signs to each other. However, the optical waveguide device 10 in the present embodiment has a configuration similar to that of the first embodiment described above. It is to be noted that, in FIG. 2, basically like elements to those of FIG. 1 are denoted by like reference characters.

Here, the power supplies 7a and 7b connected to the first and second potential supplying electrode sections 4a-1 and 4b-1, respectively, generate mutually complementary voltages (having values whose absolute values are equal to each other but whose signs are opposite to each other). The absolute value of the voltage values generated by the power supplies 7a and 7b is equal to one half that of the power supply 7 in the first embodiment. In this instance, the power supply 7a generates a voltage $V=-V_0/2$ and the power supply 7b generates a voltage $V=-V_0/2$.

Consequently, the potential of the first waveguide electrode section 4a-2 becomes $V=-V_0/2$, but the potential of the two second potential difference producing electrode sections 4b-31 and 4b-32 formed so as to sandwich the first waveguide electrode section 4a-2 therebetween becomes $V=+V_0/2$. Therefore, the voltage $V=-V_0$ which is a potential difference between the first waveguide electrode section 4a-2 and the second potential difference producing electrode sections 4b-31 and 4b-32 can applied as a bias voltage to the linear waveguide 2b.

Further, while the potential of the second waveguide electrode section 4b-2 becomes $V=+V_0/2$, the potential of the two first potential difference producing electrode sections 4a-31 and 4a-32 formed so as to sandwich the first waveguide electrode section 4b-2 therebetween becomes $V=-V_0/2$. Therefore, the voltage $V=+V_0$ which is a potential difference between the first waveguide electrode section 4b-2 and the second potential difference producing electrode sections 4a-31 and 4a-32 can be applied as a bias voltage to the linear waveguide 2c.

In other words, since the first and second bias electrodes 4a and 4b complement the potentials thereof each other, the voltages having an equal absolute value but having the opposite signs to each other are applied to the linear waveguides 2b and 2c.

Due to the configuration described above, in the optical modulator 11-2 to which the optical waveguide device 10 according to the second embodiment of the present invention is applied, the voltage $V=-V_0/2$ from the power supply 7a is applied to the first bias electrode 4a, and the voltage $V=+V_0/2$ from the power supply 7b is applied to the second bias electrode 4b. However, since the potentials of the first and second bias electrodes 4a and 4b complement each other, the potential difference $V=-V_0$ can be obtained as the bias voltage for the linear waveguide 2b, and the potential difference $V=+V_0$ can be obtained as the bias voltage for the linear waveguide 2c.

In this manner, with the optical waveguide device according to the second embodiment of the present invention, similarly as in the case of the dual electrode structure wherein the signal electrodes 3a and 3b are formed on the linear waveguides 2b and 2c, also where an optical modulator is formed without reducing the number of power supplies, while the voltage values to be generated are reduced to one half those of the conventional power supplies for the bias electrode, the voltages equal to those of the conventional optical waveguide devices are supplied as the bias voltage values. Therefore, the optical waveguide device is advantageous that it can contribute to reduction of the operation cost of an optical communication system.

It is to be noted that, in the second embodiment described above, the first potential to be supplied to the first potential supplying electrode section 4a-1 is set to $V=-V_0/2$ and the second potential to be supplied to the second potential supplying electrode section 4b-1 is set to $V=+V_0/2$. However, also it is possible to set the first potential to be supplied to the first potential supplying electrode section 4a-1 to $V=+V_0/2$ and set the second potential to be supplied to the second potential supplying electrode section 4b-1 to $V=-V_0/2$.

[c] Description of the Third Embodiment

Figure 5:
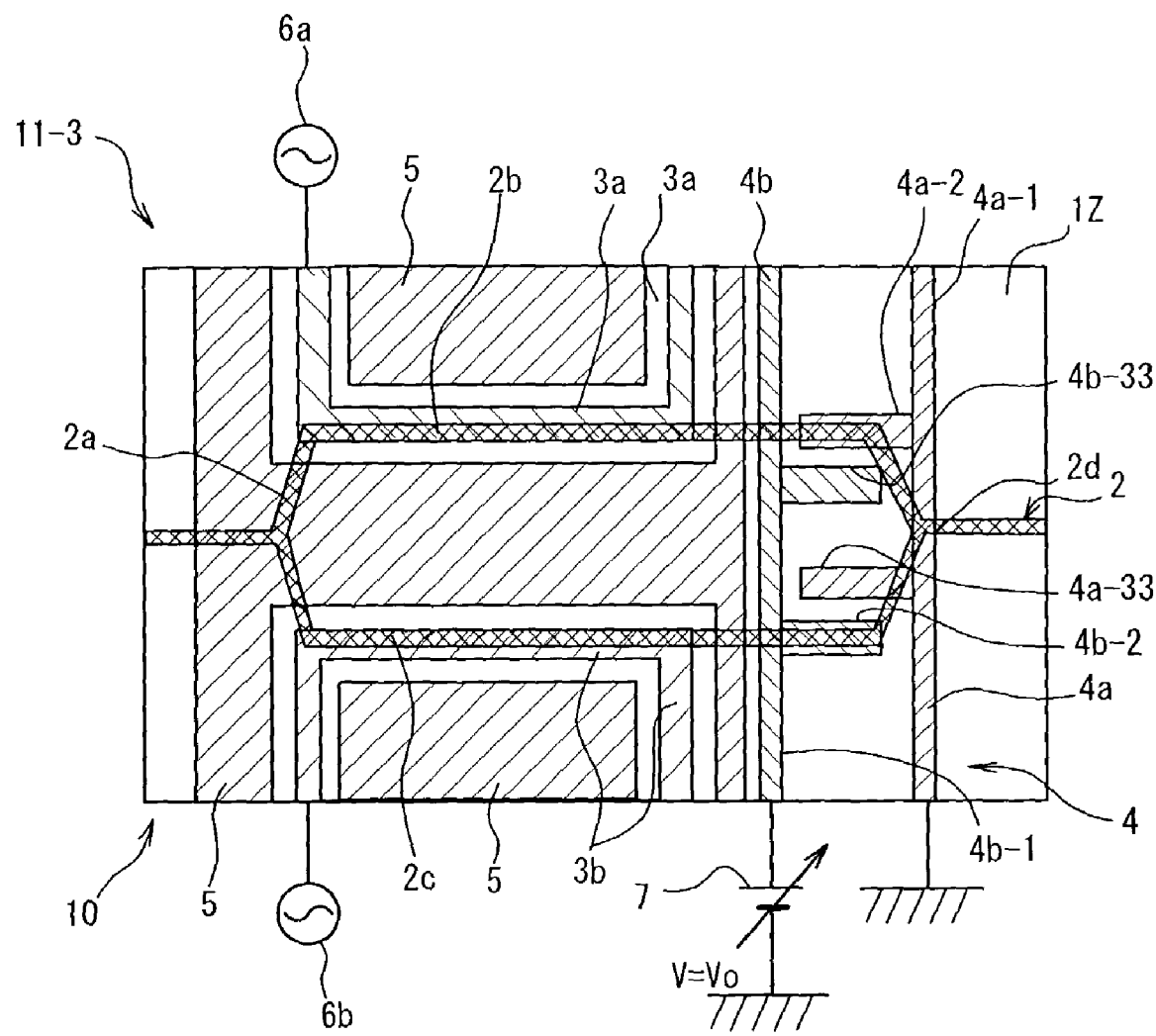
FIG. 5 is a schematic view showing an optical waveguide device according to a third embodiment of the present invention.

FIG. 5 is a schematic view showing an optical modulator to which an optical waveguide device according to the third embodiment of the present invention is applied. The optical modulator 11-3 shown in FIG. 5 is different, when compared with the optical modulators of the first and second embodiments, in that (not two but) one first potential difference producing electrode section 4b-33 is provided in the proximity of the first waveguide electrode 4a-2, and a single second potential difference producing electrode section 4a-33 is provided also in the proximity of the second waveguide electrode 4b-2. It is to be noted that, in FIG. 5, basically like elements to those of FIGS. 1 and 2 are denoted by like reference characters.

Also in the optical waveguide device according to the third embodiment having such a configuration as described above, similarly as in the optical waveguide devices of the first and second embodiments described above, while the voltage values to be generated are reduced by one half those of the conventional power supplies for the bias electrodes, the voltages equal to those in the conventional optical waveguide devices can be supplied as the bias voltage values. Therefore, the optical waveguide device is advantageous in that it can contribute to reduction of the operation cost of an optical communication system.

[d] Others

While, in the embodiments described above in detail, a Mach-Zehnder type optical waveguide is applied as the interference type optical waveguide, according to the present invention, also any other known interference type optical waveguide can be applied as the interference type optical waveguide.

Further, in the embodiments described above in detail, the bias electrode 4 is formed as a bias electrode for biasing the signal components to be applied to the signal electrodes 3a and 3b on the two linear waveguides 2b and 2c which form a Mach-Zehnder type optical modulator, the present invention is not limited to the specific configuration but can be applied similarly also where the bias electrode 4 is formed a bias electrode for biasing signal components to be applied to signal electrodes for three or more parallel optical waveguides.

Also in this instance, the bias electrode includes not only first and second potential supplying electrode portions similar to those in the embodiments described above but also comb branch-like waveguide electrode portions formed on the three or more parallel optical waveguides at the stage next to the signal electrodes for alternately receiving potentials from the first and second potential supplying electrode portions in order of the parallel arrangement of the three or more optical waveguides, and at least comb branch-like potential difference producing electrode portions formed in such a manner as to sandwich the waveguide electrodes therebetween to which the potential from one of the potential supplying electrode portions is supplied for supplying the potential from the other one of the potential supplying electrode portions.

Consequently, the bias electrode can apply voltages having an equal absolute value but having the opposite signs to each other to adjacent ones of the three or more parallel waveguides since the potentials to be supplied to adjacent ones of the optical waveguides complement each other.

Further, the present invention can be applied also to an optical waveguide device which at least includes a substrate cut in the Z-axis direction and having an electro-optical effect, such an interference type optical waveguide as described above, and a lumped-constant type electrode for applying voltages for the electro-optical effect described above to lights propagating along optical waveguides which form the interference type optical waveguide if the lumped-constant type optical electrode is configured similarly to any of the bias electrodes in the embodiments described above.

The present invention is not limited to the embodiments specifically described above, and variations and modifications can be made without departing from the scope of the present invention.

Further, the optical waveguide device according to the present invention can be produced in accordance with the embodiments described above.

What is claimed is:

1. An optical waveguide device, comprising:
   a substrate cut in a Z-axis direction and having an electro-optical effect;
   an interference type optical waveguide formed on said substrate for causing lights which propagate along a pair of optical waveguides to interfere with each other; and
   a lumped-constant type electrode for applying voltages for the electro-optical effect to the respective lights propagating along said optical waveguides which form said interference type optical waveguide, wherein
   said lumped-constant type electrode comprises first and second comb-shaped electrodes each having a trunk electrode and a plurality of branch electrodes,
   the branch electrodes of the first comb-shaped electrode and the branch electrodes of the second comb-shaped electrode are collocated alternatively together so that the branch electrodes thereby complement potentials to be supplied to each of the optical waveguides in the pair and so that electric fields having an equal absolute value but having the opposite signs are applied to the optical waveguides,
   the branch electrodes of the first and second comb-shaped electrodes are parallel to the pair of optical waveguides,
   the branch electrodes of the first comb-shaped electrode include a first waveguide electrode section formed above one of the optical waveguides in pair,
   the branch electrodes of the second comb-shaped electrode include a second waveguide electrode section formed above the other of the optical waveguides in the pair,
   the branch electrodes of the first comb-shaped electrode include two potential difference producing electrode sections which sandwich in the second waveguide electrode waveguide section, and
   the branch electrodes of the second comb-shaped electrode include two potential difference producing electrode sections which sandwich in the first waveguide electrode section.

2. The optical waveguide device as claimed in claim 1, wherein said interference type optical waveguide is a Mach-Zehnder type optical waveguide.

3. An optical waveguide device, comprising:
   a substrate cut in a Z-axis direction and having an electro-optical effect;
   an interference type optical waveguide formed on said substrate for causing lights which propagate along two optical waveguides to interfere with each other;

a first signal electrode formed above one of said two optical waveguides which form said interference type optical waveguide;

a second signal electrode formed above the other of said two optical waveguides which form said interference type optical waveguide;

a first bias electrode for biasing a signal component to be applied to said first signal electrode; and a second bias electrode for biasing a signal component to be applied to said second signal electrode, wherein said first and second bias electrodes respectively comprise first and second comb-shaped electrodes each having a trunk electrode and a plurality of branch electrodes, said branch electrodes of said first comb-shaped electrode and said branch electrodes of said second comb-shaped electrode are collocated alternatively together so that the branch electrodes thereby complement the potentials thereof each other and so that electric fields having an equal absolute value but having the opposite signs are applied to said two optical waveguides, said trunk electrode of said first comb-shaped electrode is a first potential supplying electrode section to which a first potential is applied, said trunk electrode of said second comb-shaped electrode is a second potential supplying electrode section to which a second potential different from the first potential is applied, one of said branch electrodes of said first comb-shaped electrode is a first waveguide electrode section formed above the one optical waveguide at a next stage to said first signal electrode for receiving the potential supplied from said first potential supplying electrode section, one of said branch electrodes of said second comb-shaped electrode is a second waveguide electrode section formed above the other optical waveguide at a next stage to said second signal electrode for receiving the potential supplied from said second potential supplying electrode section, other of said branch electrodes of said second comb-shaped electrode is a first potential difference producing electrode section formed in such a manner as to sandwich said first waveguide electrode section therebetween for supplying the potential from said second potential supplying electrode section, and other of said branch electrodes of said first comb-shaped electrode is a second potential difference producing electrode section formed in such a mannner to sandwich said second waveguide electrode section therebetween for supplying the potential from said first potential supplying electrode section.

4. The optical waveguide device as claimed in claim 3, wherein said interference type optical waveguide is a Mach-Zehnder type optical waveguide.

5. An optical waveguide device, comprising:
a substrate having an electro-optical effect;
a pair of optical waveguides formed on said substrate; and
a lumped-constant type electrode for applying voltages to the respective optical waveguides, wherein
said lumped-constant type electrode comprises first and second comb-shaped electrodes each for complementing potentials to be supplied to each of the optical waveguides in the pair, each of the first and second comb-shaped electrodes has a trunk electrode and a plurality of branch electrodes, the branch electrodes of the first and second comb-shaped electrodes are parallel to the optical waveguides, the branch electrodes of the first comb-shaped electrode include a first waveguide electrode section formed above one of the optical waveguides in the pair, the branch electrodes of the second comb-shaped electrode include a second waveguide electrode section formed above the other of the optical waveguides in the pair, the branch electrodes of the first comb-shaped electrode include two potential difference producing electrode sections which sandwich in the second waveguide electrode section, and the branch electrodes of the second comb-shaped electrode include two potential difference producing electrode sections which sandwich in the first waveguide electrode section.

6. The optical waveguide device as claimed in claim 5, wherein the branch electrodes of the first comb-shaped electrode are interleaved with the branch electrodes of the second comb-shaped electrode.

7. An optical waveguide device, comprising:
a substrate cut in a Z-axis direction and having an electro-optical effect;
an interference type optical waveguide formed on said substrate for causing lights which propagate along first and second optical waveguides to interfere with each other;
first and second electrodes for applying voltages for the electro-optical effect to the first and the second optical waveguides, respectively;
a first bias electrode, formed above the first optical waveguide and disposed in series to the first electrode along the first optical waveguide, for applying ground voltage to cause a first electric field in the first optical waveguide;
a second bias electrode, formed above the second optical waveguide and disposed in series to the second electrode along the second optical waveguide, for applying a predetermined voltage to cause a second electric field in the second optical waveguide;
a third bias electrode which includes two electrodes allocated so as to sandwich in the first bias electrode; and
a fourth bias electrode which includes two electrodes allocated so as to sandwich in the second bias electrode,
wherein said first electric field and said second electric field have an equal absolute value but have the opposite signs with each other.

8. An optical waveguide device, comprising:
a substrate cut in a Z-axis direction and having an electro-optical effect;
an interference type optical waveguide formed on said substrate for causing lights which propagate along first and second optical waveguides to interfere with each other; and
first and second electrodes for applying voltages for the electro-optical effect to the first and the second optical waveguides, respectively;
a first bias electrode formed above the first optical waveguide for applying a voltage +V;
a second bias electrode formed above the second optical waveguide for applying a voltage −V;
a third bias electrode for applying the voltage −V to a first location above said substrate in proximity to said first bias electrode rather than said second bias electrode, which includes two electrode sections allocated so as to sandwich in the first bias electrode; and a fourth bias electrode for applying the voltage +V to a second location above said substrate in proximity to said second bias electrode rather than said first bias electrode which includes two electrode sections allocated so as to sandwich in the second bias electrode.

9. The optical waveguide device as claimed in claim 8, wherein said first bias electrode and said third bias electrode are coupled up, and said second bias electrode and said fourth bias electrode are coupled up.

10. An apparatus comprising:
a substrate having an electro-optical effect;
first and second optical waveguides formed on the substrate adjacent to each other; and
a lumped-constant type electrode to apply voltages to the firs and second optical waveguides, wherein
the lumped-constant type electrode comprises first and second comb-shaped electrodes complementing potentials of each other to be supplied to the first and second optical waveguides,
each of the first and second comb-shaped electrodes has a trunk electrode and a plurality of branch electrodes,
the branch electrodes of the first and second comb-shaped electrodes are parallel to the first and second optical waveguides,
the branch electrodes of the first comb-shaped electrode include a first waveguide electrode section formed above the first optical waveguide,
the branch electrodes of the second comb-shaped electrode include a second waveguide electrode section formed above the second optical waveguide,
the branch electrodes of the first comb-shaped electrode include two potential difference producing electrode sections which sandwich in the second waveguide electrode section, and
the branch electrodes of the second comb-shaped electrode include two potential difference producing electrode sections which sandwich in the first waveguide electrode section.

11. An apparatus as in claim 10, wherein the first and second optical waveguides are part of a Mach-Zehnder type optical waveguide formed on the substrate.

12. An apparatus as in claim 10, wherein the substrate is cut in a Z-axis direction.

13. An optical waveguide device comprising:
a substrate having an electro-optical effect;
first and second optical waveguides formed on the substrate adjacent to each other;
a first comb-shaped electrode having a trunk electrode and branch electrodes extending from the trunk electrode; and
a second comb-shaped electrode having a trunk electrode and branch electrodes extending from the trunk electrode, wherein
the branch electrodes of the first comb-shaped electrode and the branch electrodes of the second comb-shaped electrode are interleaved with each other to thereby complement potentials of each other to be supplied to the first and second optical waveguides,
the branch electrodes of the first and second comb-shaped electrodes are parallel to the first and second optical waveguides,
the branch electrodes of the first comb-shaped electrode include a first waveguide electrode section formed above the first optical waveguide,
the branch electrodes of the second comb-shaped electrode include a second waveguide electrode section formed above the second optical waveguide,
the branch electrodes of the first comb-shaped electrode include two potential difference producing electrode sections which sandwich in the second waveguide electrode section, and
the branch electrodes of the second comb-shaped electrode include two potential difference producing electrode sections which sandwich in the first waveguide electrode section.

14. An apparatus as in claim 13, wherein the first and second optical waveguides are part of a Mach-Zehnder type optical waveguide formed on the substrate.

15. An apparatus as in claim 13, wherein the substrate is cut in a Z-axis direction.

16. An apparatus comprising:
a Z-cut substrate having an electro-optical effect;
A Mach-Zehnder type optical waveguide formed on the substrate, the Mach-Zehnder type optical waveguide comprising first and second optical waveguides adjacent to each other;
a first comb-shaped electrode having a trunk electrode and branch electrodes extending from the trunk electrode; and
a second comb-shaped electrode having a trunk electrode and branch electrodes extending from the trunk electrode, wherein
the branch electrodes of the first comb-shaped electrode and the branch electrodes of the second comb-shaped electrode are interleaved with each other to thereby complement potentials of each other to be supplied to the to the first and second optical waveguides,
the branch electrodes of the first and second comb-shaped electrodes are parallel to the first and second optical waveguides,
the branch electrodes of the first comb-shaped electrode include a first waveguide electrode section formed above the first optical waveguide,
the branch electrodes of the second comb-shaped electrode include a second waveguide electrode section formed above the second optical waveguide,
the branch electrodes of the first comb-shaped electrode include two potential difference producing electrode sections which sandwich in the second waveguide electrode section, and
the branch electrodes of the second comb-shaped electrode include two potential difference producing electrode sections which sandwich in the first waveguide electrode section.

* * * * *

UNITED STATES PATENT AND TRADEMARK OFFICE
CERTIFICATE OF CORRECTION

PATENT NO. : 7,239,764 B2  
APPLICATION NO. : 10/298560  
DATED : July 3, 2007  
INVENTOR(S) : Masaharu Doi et al.

Page 1 of 1

It is certified that error appears in the above-identified patent and that said Letters Patent is hereby corrected as shown below:

Col. 10, line 45, before "pair" insert --the--

Col. 11, line 51, delete "manner" and insert --manner as--, therefor.

Col. 13, line 7, before "which" insert --,--

Col. 13, line 18, delete "firs" and insert --first--, therefor.

Col. 14, line 25, before "Mach-Zehnder" delete "A" and insert --a--, therefor.

Col. 14, line 39, after "to the" delete "to the".

Signed and Sealed this

Eighteenth Day of December, 2007

JON W. DUDAS  
*Director of the United States Patent and Trademark Office*